US012355543B2

United States Patent
Zhu et al.

(10) Patent No.: US 12,355,543 B2
(45) Date of Patent: Jul. 8, 2025

(54) PORT SELECTION DIVERSITY

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 17/805,666

(22) Filed: Jun. 6, 2022

(65) Prior Publication Data

US 2023/0396309 A1  Dec. 7, 2023

(51) Int. Cl.
*H04B 7/08* (2006.01)
*H04L 5/00* (2006.01)
*H04W 48/18* (2009.01)
*H04W 56/00* (2009.01)

(52) U.S. Cl.
CPC ......... *H04B 7/0868* (2013.01); *H04L 5/0051* (2013.01); *H04W 48/18* (2013.01); *H04W 56/001* (2013.01)

(58) Field of Classification Search
CPC .... H04B 7/0868; H04L 5/0051; H04W 48/18; H04W 56/001
See application file for complete search history.

(56) References Cited

U.S. PATENT DOCUMENTS

2016/0316433 A1* 10/2016 Clevorn ............ H04W 52/0229

FOREIGN PATENT DOCUMENTS

| CN | 107994930 A | * | 5/2018 | ........... H04B 7/0404 |
| CN | 116800356 A | * | 9/2023 | |
| WO | WO-2024060045 A1 | * | 3/2024 | |

* cited by examiner

*Primary Examiner* — Melvin C Marcelo
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may receive, using a first reception port and a second reception port, at least one reference signal. The UE may select, based at least in part on a port selection diversity metric associated with the at least one reference signal, a selected reception port of the first reception port and the second reception port. The UE may receive a communication using the selected reception port. Numerous other aspects are described.

30 Claims, 7 Drawing Sheets

PORT SELECTION DIVERSITY

FIELD OF THE DISCLOSURE

Aspects of the present disclosure generally relate to wireless communication and to techniques and apparatuses for port selection diversity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, using a first reception port and a second reception port, at least one reference signal. The one or more processors may be configured to select, based at least in part on a port selection diversity metric associated with the at least one reference signal, a selected reception port of the first reception port and the second reception port. The one or more processors may be configured to receive a communication using the selected reception port.

Some aspects described herein relate to a method of wireless communication performed by a UE. The method may include receiving, using a first reception port and a second reception port, at least one reference signal. The method may include selecting, based at least in part on a port selection diversity metric associated with the at least one reference signal, a selected reception port of the first reception port and the second reception port. The method may include receiving a communication using the selected reception port.

Some aspects described herein relate to a non-transitory computer-readable medium that stores a set of instructions for wireless communication by a UE. The set of instructions, when executed by one or more processors of the UE, may cause the UE to receive, using a first reception port and a second reception port, at least one reference signal. The set of instructions, when executed by one or more processors of the UE, may cause the UE to select, based at least in part on a port selection diversity metric associated with the at least one reference signal, a selected reception port of the first reception port and the second reception port. The set of instructions, when executed by one or more processors of the UE, may cause the UE to receive a communication using the selected reception port.

Some aspects described herein relate to an apparatus for wireless communication. The apparatus may include means for receiving, using a first reception port and a second reception port, at least one reference signal. The apparatus may include means for selecting, based at least in part on a port selection diversity metric associated with the at least one reference signal, a selected reception port of the first reception port and the second reception port. The apparatus may include means for receiving a communication using the selected reception port.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
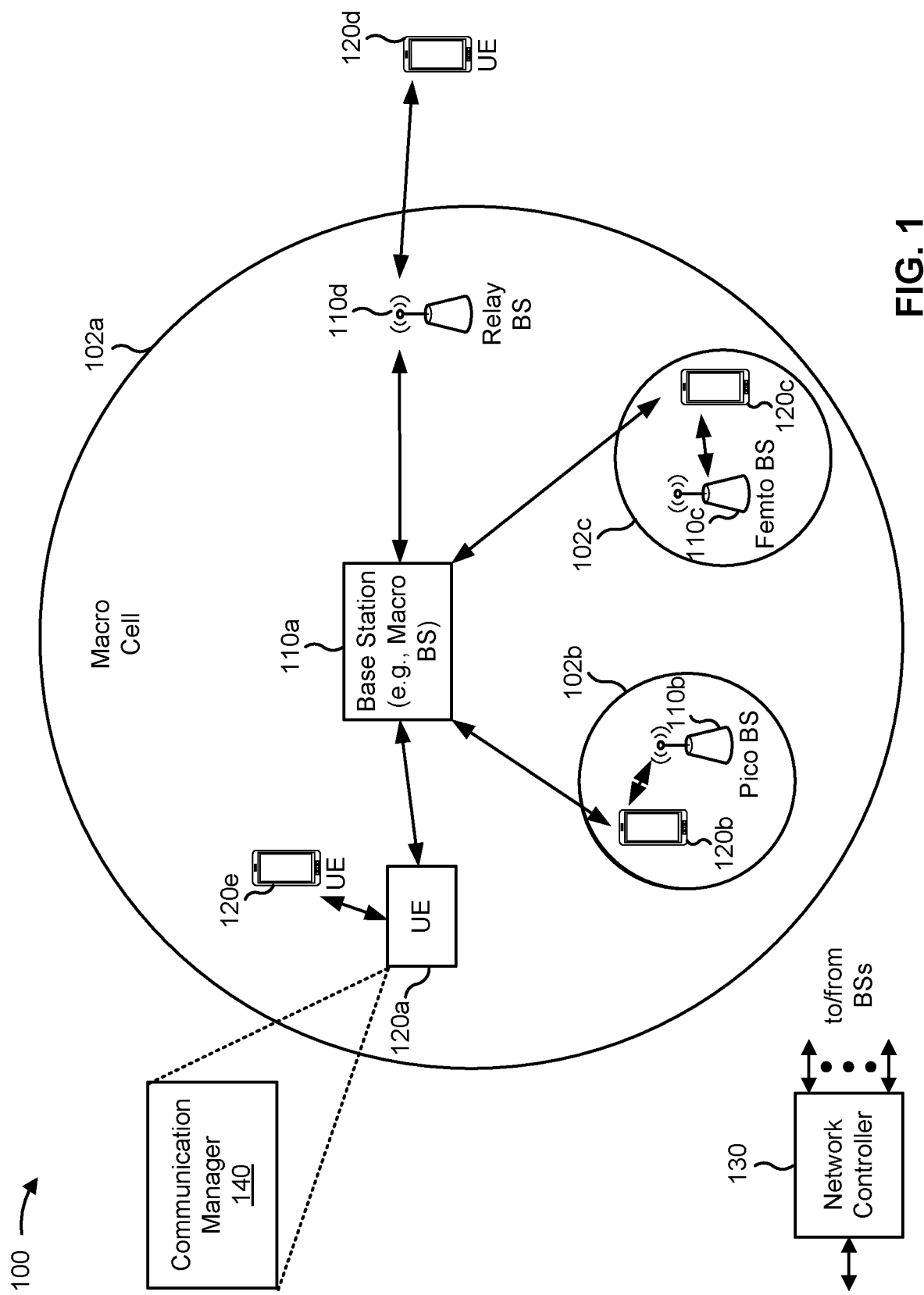
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a ULE 120d, and a ULE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, using a first reception port and a second reception port, at least one reference signal; select, based at least in part on a port selection diversity metric associated with the at least one reference signal, a selected reception port of the first reception port and the second reception port; and receive a communication using the selected reception port. Additionally, or alternatively, the communication manager 140 may perform one or more other operations described herein.

In some aspects, the term "base station" (e.g., the base station 110) or "network node" or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (e.g., within a single device or unit). A disaggregated base station may be configured to utilize a protocol stack that is physically or logically distributed among two or more units (e.g., one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN) such as the network configuration sponsored by the O-RAN Alliance, or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
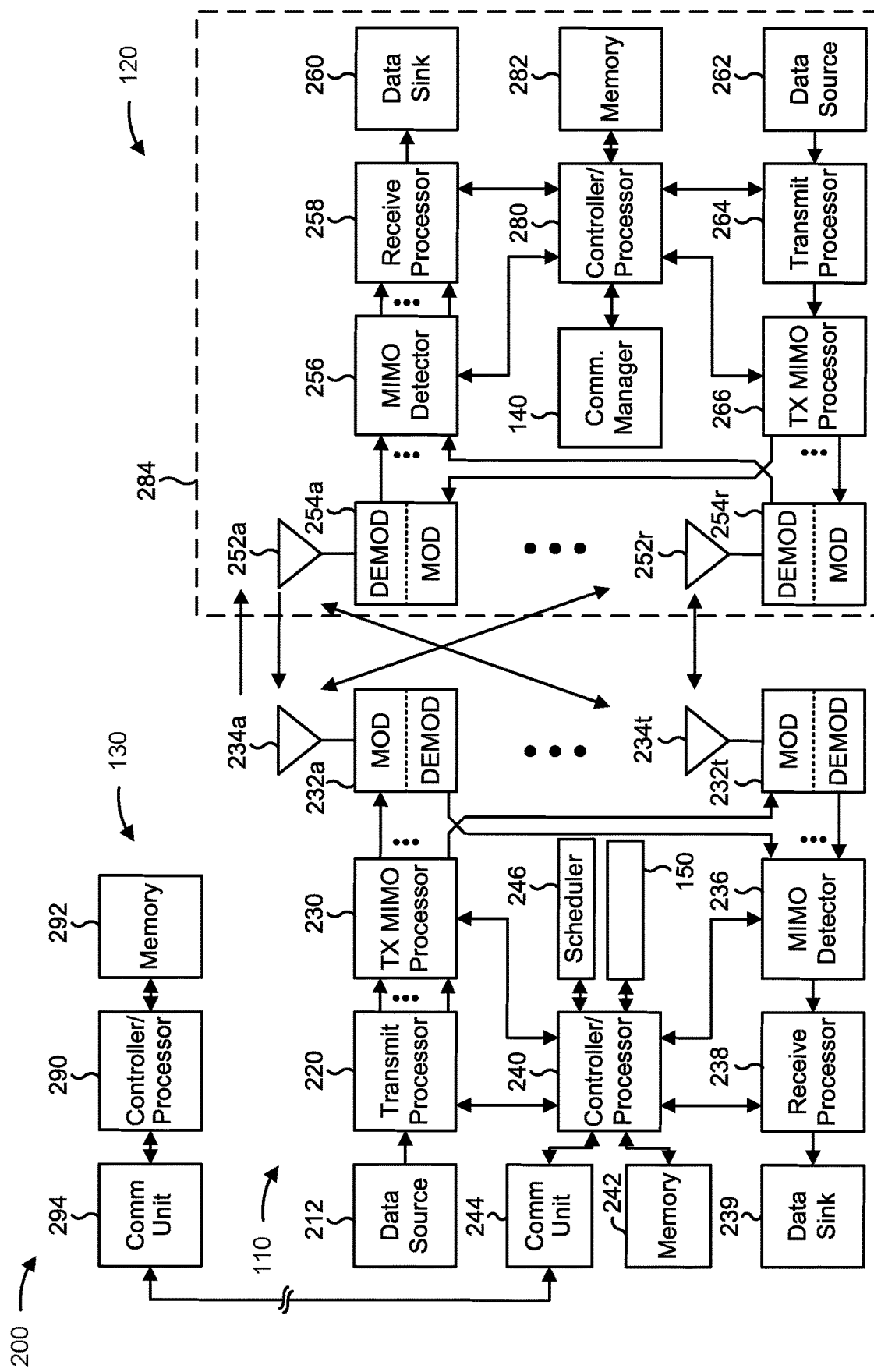
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with port selection diversity, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, using a first reception port and a second reception port, at least one reference signal; means for selecting, based at least in part on a port selection diversity metric associated with the at least one reference signal, a selected reception port of the first reception port and the second reception port; and/or means for receiving a communication using the selected reception port. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
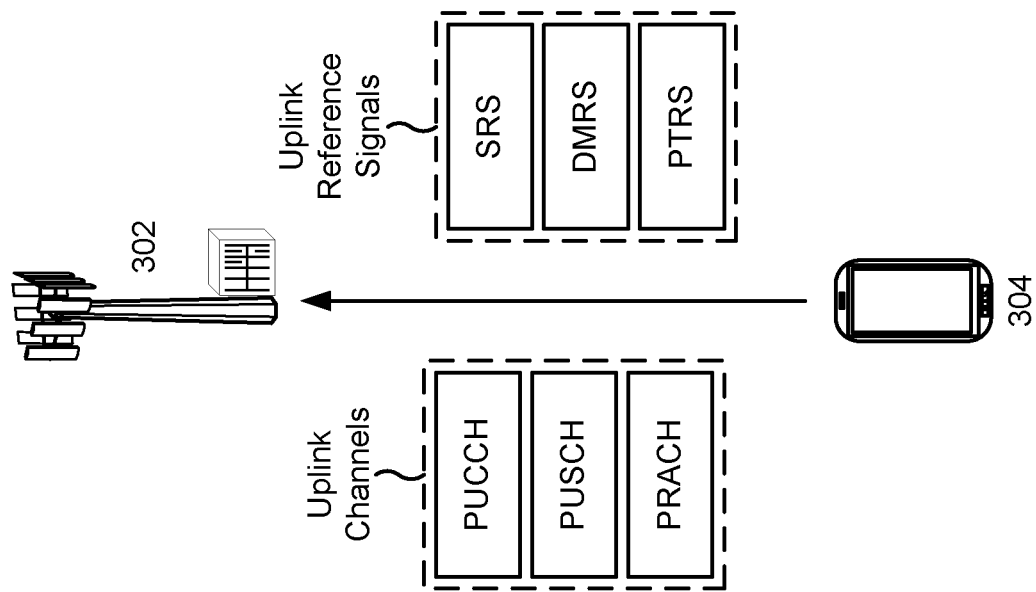
FIG. 3 is a diagram illustrating an example of physical channels and reference signals in a wireless network, in accordance with the present disclosure.
Figure 3:
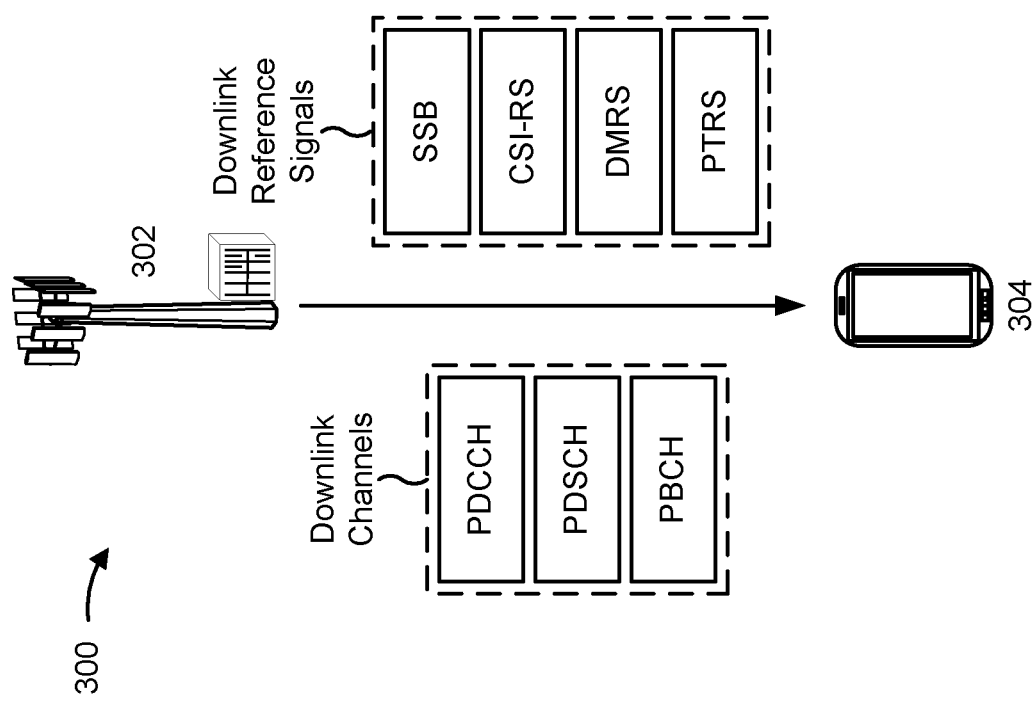

FIG. 3 is a diagram illustrating an example 300 of physical channels and reference signals in a wireless network, in accordance with the present disclosure. As shown in FIG. 3, downlink channels and downlink reference signals may carry information from a network node 302 to a UE 304, and uplink channels and uplink reference signals may carry information from a UE 304 to a network node 302.

As shown, a downlink channel may include a physical downlink control channel (PDCCH) that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 304 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, and/or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 302 may transmit multiple SSBs on multiple corresponding beams, and the SSBs may be used for beam selection or beam management.

A CSI-RS may carry information used for downlink channel estimation (e.g., downlink CSI acquisition), which may be used for scheduling, link adaptation, or beam management, among other examples. The network node 302 may configure a set of CSI-RSs for the UE 304, and the UE 304 may measure the configured set of CSI-RSs. Based at least in part on the measurements, the UE 304 may perform channel estimation and may report channel estimation parameters to the network node 302 (e.g., in a CSI report), such as a CQI, a precoding matrix indicator (PMI), a CSI-RS resource indicator (CRI), a layer indicator (LI), a rank indicator (RI), or an RSRP, among other examples. The network node 302 may use the CSI report to select transmission parameters for downlink communications to the UE 304, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., a PDCCH, PDSCH, PBCH, PUCCH, or PUSCH). The design and mapping of a DMRS may be specific to the physical channel for which the DMRS is used for channel estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The network node 302 may configure one or more SRS resource sets for the UE 304, and the UE 304 may transmit SRSs on the configured SRS resource sets. An SRS resource set may have a configured usage, such as uplink CSI acquisition, downlink CSI acquisition for reciprocity-based operations, uplink beam management, among other examples. The network node 302 may measure the SRSs, may perform channel estimation based at least in part on the measurements, and may use the SRS measurements to configure communications with the UE 304.

As indicated above, FIG. 3 is provided as an example. Other examples may differ from what is described with regard to FIG. 3.

Figure 4:
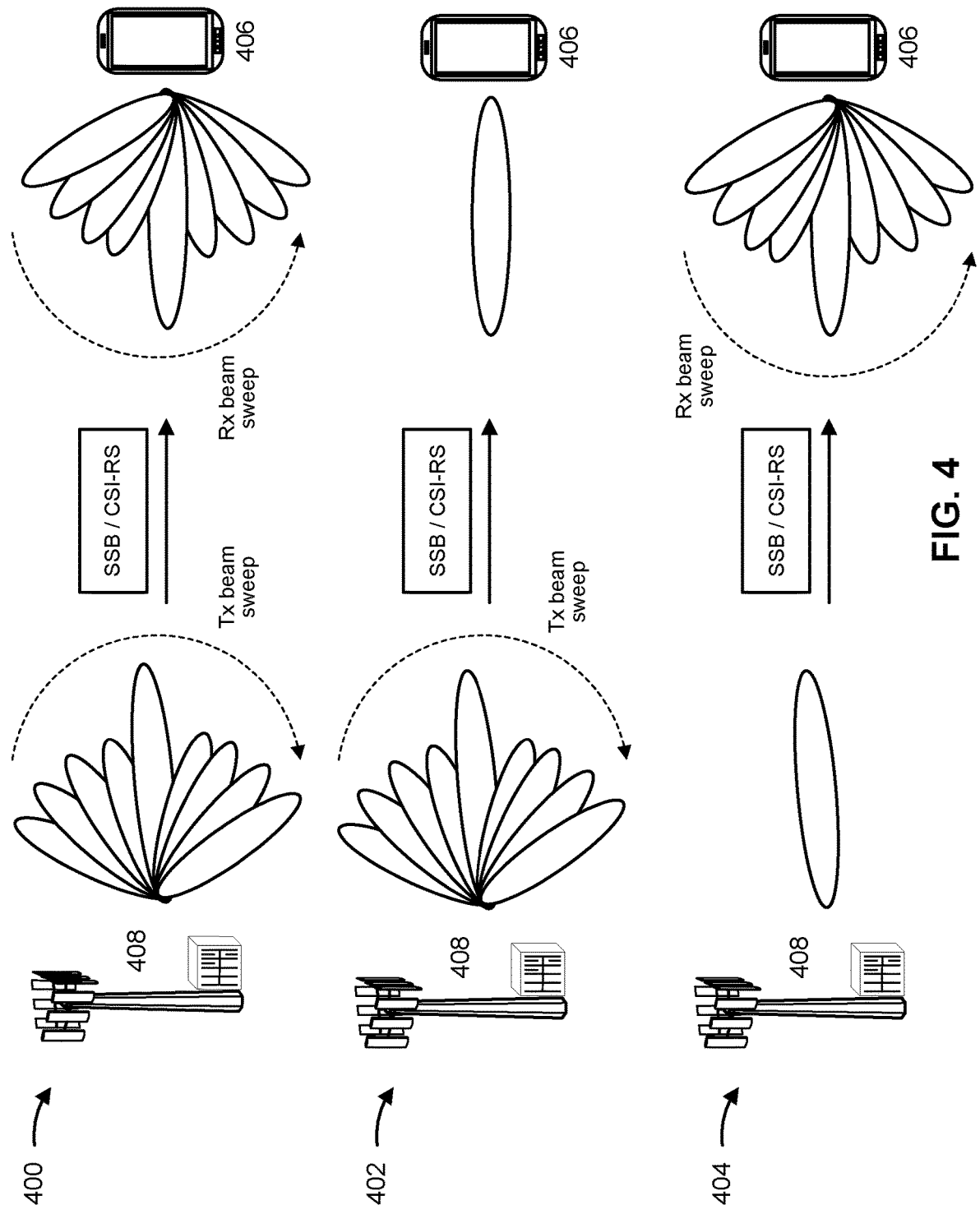
FIG. 4 is a diagram illustrating examples of beam management procedures based on downlink reference signal transmissions, in accordance with the present disclosure.

FIG. 4 is a diagram illustrating examples 400, 402, and 404 of beam management procedures based on downlink reference signal transmissions, in accordance with the present disclosure. As shown in FIG. 4, examples 400, 402, and 404 include a UE 406 in communication with a network node 408 in a wireless network (e.g., wireless network 100). However, the devices shown in FIG. 4 are provided as examples, and the wireless network may support communication and beam management between other devices (e.g., between a UE 120 and a TRP, DU, or RU, between a mobile termination node and a control node, between an IAB child node and an IAB parent node, and/or between a scheduled node and a scheduling node). In some aspects, the UE 406 and the network node 408 may be in a connected state (e.g., a radio resource control (RRC) connected state) when performing the beam management procedure(s).

As shown in FIG. 4, example 400 may include a network node 408 and a UE 406 communicating to perform beam management using SSB or CSI-RS transmissions. Example 400 depicts a first beam management procedure (e.g., P1 beam management). The first beam management procedure may be referred to as a beam selection procedure, an initial beam acquisition procedure, a beam sweeping procedure, a cell search procedure, and/or a beam search procedure. As shown in FIG. 4 and example 400, SSBs and/or CSI-RSs may be configured to be transmitted from the network node 408 to the UE 406 during the first beam management procedure. For example, an SSB transmitted by the network node 408 is a rank-1 periodic reference signal that is always transmitted by the network node 408 to enable initial network acquisition and synchronization in addition to beam selection and beam management. For example, an identifier associated with an SSB may have a one-to-one mapping to a transmit beam used by the network node 408, and the one-to-one mapping may be invariant (e.g., static) over time. The CSI-RSs used for beam selection or beam management may be configured to be periodic (e.g., using RRC signaling), semi-persistent (e.g., using media access control (MAC) control element (MAC-CE) signaling), and/or aperiodic (e.g., using DCI).

The first beam management procedure may include the network node 408 performing a beam sweep over multiple transmit (Tx) beams. The network node 408 may transmit an SSB or a CSI-RS using each transmit beam for beam management. To enable the UE 406 to perform receive (Rx) beam sweeping, the network node 408 may use a transmit beam to transmit (e.g., with repetitions) each SSB or CSI-RS at multiple times within the same reference signal resource set so that the UE 406 can perform a beam sweep over multiple receive beams in multiple transmission instances. For example, if the network node 408 has a set of N transmit beams and the UE 406 has a set of M receive beams, the SSB or CSI-RS may be transmitted on each of the N transmit beams M times such that the UE 406 may receive M instances of the SSB or CSI-RS per transmit beam. In other words, for each transmit beam of the network node 408, the UE 406 may perform a beam sweep through the receive beams of the UE 406. As a result, the first beam management procedure may enable the UE 406 to measure an SSB or CSI-RS on different transmit beams using different receive beams to support selection of one or more transmit/receive beam pair(s) (e.g., a pairing between a transmit beam of the network node 408 and a receive beam of the UE 406). The UE 406 may report the measurements to the network node 408 to enable the network node 408 to select one or more beam pairs for communication between the network node 408 and the UE 406.

As shown in FIG. 4, example 402 may include a network node 408 and a UE 406 communicating to perform beam management using SSBs or CSI-RSs. Example 402 depicts a second beam management procedure (e.g., P2 beam management). The second beam management procedure may be referred to as a beam refinement procedure, a base station beam refinement procedure, a network node beam refinement procedure, and/or a transmit beam refinement procedure, among other examples. As shown in FIG. 4 and example 402, SSBs and/or CSI-RSs may be configured to be transmitted from the network node 408 to the UE 406. The SSBs may be periodic, and the CSI-RSs may be configured to be aperiodic (e.g., using DCI). The second beam management procedure may include the network node 408 performing a beam sweep over one or more transmit beams. The one or more transmit beams may be a subset of all transmit beams associated with the network node 408 (e.g., determined based at least in part on measurements reported by the UE 406 in connection with the first beam management procedure). The network node 408 may transmit an SSB or a CSI-RS using each transmit beam of the one or more transmit beams for beam management. The UE 406 may measure each SSB or CSI-RS using a single (e.g., a same) receive beam (e.g., determined based at least in part on measurements performed in connection with the first beam management procedure). The second beam management procedure may enable the network node 408 to select a best transmit beam based at least in part on measurements of the SSBs and/or CSI-RSs (e.g., measured by the UE 406 using the single receive beam) reported by the UE 406.

As shown in FIG. 4, example 404 depicts a third beam management procedure (e.g., P3 beam management). The third beam management procedure may be referred to as a beam refinement procedure, a UE beam refinement procedure, a receive beam refinement procedure, and/or a UE beam management procedure, among other examples. As shown in FIG. 4 and example 404, one or more SSBs or CSI-RSs may be configured to be transmitted from the network node 408 to the UE 406. The SSBs may be configured to be periodic, and the CSI-RSs may be configured to be aperiodic (e.g., using DCI). The third beam management process may include the network node 408 transmitting the one or more SSBs or CSI-RSs using a single transmit beam (e.g., determined based at least in part on measurements reported by the UE 406 in connection with the first beam management procedure and/or the second beam management procedure). To enable the UE 406 to perform receive beam sweeping, the base station may use a transmit beam to transmit (e.g., with repetitions) an SSB or CSI-RS at multiple times within the same reference signal resource set such that UE 406 can sweep through one or more receive beams in multiple transmission instances. The one or more receive beams may be a subset of all receive beams associated with the UE 406 (e.g., determined based at least in part on measurements performed in connection with the first beam management procedure and/or the second beam management procedure). The third beam management procedure may enable the UE 406 to select a best receive beam based at least in part on measurements of the SSBs or CSI-RSs and/or may enable the network node 408 to select a best receive beam for the UE 406 based at least in part on reported measurements received from the UE 406 (e.g., measurements of the SSB and/or CSI-RS using the one or more receive beams).

As indicated above, FIG. 4 is provided as an example of beam management procedures. Other examples of beam management procedures may differ from what is described with respect to FIG. 4. For example, the UE 406 and the network node 408 may perform the third beam management procedure before performing the second beam management procedure, and/or the UE 406 and the network node 408 may perform a similar beam management procedure to select a UE transmit beam.

In some cases, a transmit antenna and/or a receive antenna can have two ports, which can include a horizontally polarized (H) port (which also may be referred to as a "horizontal port") and a vertically polarized (V) port (which also may be referred to as a "vertical port"). Horizontal polarization and vertical polarization can refer to a horizontal direction and a vertical direction, respectively, relative to a specified coordinate system associated with the corresponding antenna. Accordingly, in cases where a transmitter (e.g., the network node 408) transmits a signal using both the H port and the V port independently and/or transmits a signal using a suitable precoder (e.g., a non-linear precoder), a receiver (e.g., the UE 406) can simultaneously observe two streams of the transmitted signal, which can be referred to as rank-2 communication, where a rank value generally refers to a number of transmission streams that are observed at a receiver (e.g., a UE 406). Alternatively, in cases where the transmitter uses a linear precoder (e.g., an H+V precoder or an H−V precoder), or transmits a signal using only one port (e.g., only the H port or only the V port), the receiver can observe only one stream of the transmitted signal, which can be referred to as rank-1 communication. In some cases, a UE can be configured to always use both H and V ports for reception, to ensure optimal performance. However, using both H and V ports can result in increased power consumption.

Some aspects of the techniques and apparatuses described herein may utilize port selection diversity to facilitate dynamic selection of a reception port. For example, in some aspects, a UE may receive, using a first reception port and a second reception port, at least one reference signal. The UE may select, based at least in part on a port selection diversity metric associated with the at least one reference signal, a selected reception port of the first reception port and the second reception port. The UE may receive a communication using the selected reception port. In this way, some aspects may facilitate reducing UE power consumption during reception, while mitigating loss of performance due to using only one port. As a result, some aspects may positively impact UE performance.

Figure 5:
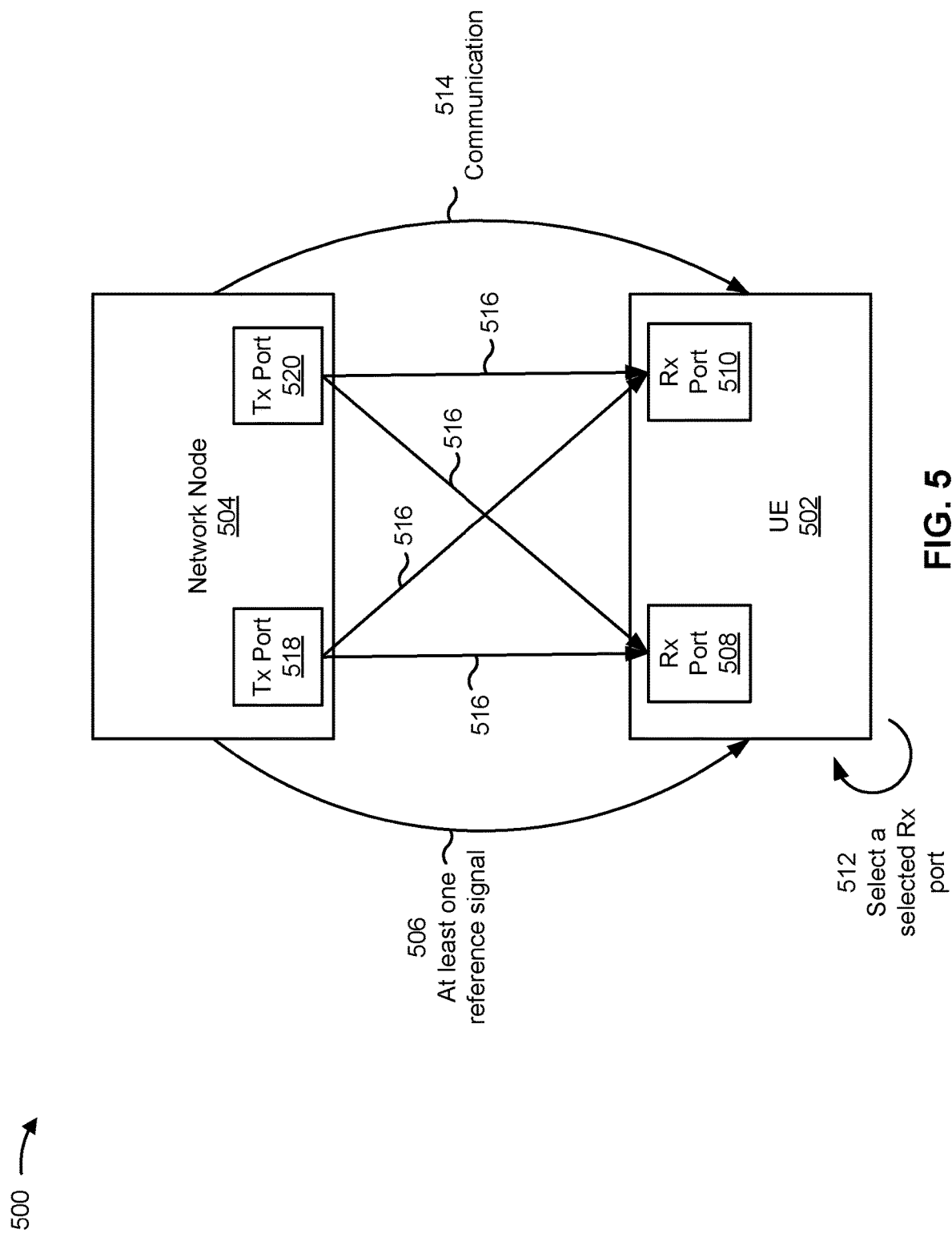
FIG. 5 is a diagram illustrating an example associated with port selection diversity, in accordance with the present disclosure.

FIG. 5 is a diagram illustrating an example 500 associated with reception port diversity, in accordance with the present disclosure. As shown in FIG. 5, example 500 includes a UE 502 in communication with a network node 504 (e.g., a base station, TRP, DU, and/or RU, among other examples) in a wireless network. In some aspects, the UE 502 and the network node 504 may communicate using beamforming via a wireless access link, which may include an uplink and a downlink.

As shown by reference number 506, the network node 504 may transmit, and the UE 502 may receive, at least one reference signal. The UE 502 may receive the at least one reference signal using a first reception port 508 and a second reception port 510. In some aspects, for example, the first reception port 508 may be an H port and the second reception port 510 may be a V port. In some aspects, the at least one reference signal may include at least one SSB. In some aspects, the at least one reference signal may include at least one DMRS.

As shown by reference number 512, the UE 502 may select a selected reception (Rx) port. In some aspects, the UE 502 may select the selected reception port, of the first reception port 508 and the second reception port 510, based at least in part on a port selection diversity metric associated with the at least one reference signal. As shown by reference number 514, the UE 502 may receive a communication using the selected reception port.

In some aspects, the port selection diversity metric may include a maximum SSB RSRP of a set of SSB RSRPs corresponding to the first reception port 508 and the second reception port 510. For example, the set of SSB RSRPs may include at least one SSB RSRP corresponding to the first reception port 508 and at least one SSB RSRP corresponding to the second reception port 510. The at least one SSB RSRP corresponding to the first reception port 508 may include a first plurality of SSB RSRPs associated with a plurality of reception beams and the at least one SSB RSRP corresponding to the second reception port 510 may include a second plurality of SSB RSRPs associated with the plurality of reception beams. Each SSB RSRP of the set of SSB RSRPs may include a rank-1 metric.

For example, in some aspects, an SSB 516 may be transmitted by the network node 504 using a first transmission (Tx) port 518 and a second transmission port 520. The SSB 516 may be transmitted using a rank-1 precoder, $$\begin{bmatrix} 1 \\ 1 \end{bmatrix},$$

and the received signal may be represented as:

$$\begin{bmatrix} UE\,Rx0 \\ UE\,Rx1 \end{bmatrix} = \frac{1}{\sqrt{2}} \begin{bmatrix} h_{01} & h_{02} \\ h_{11} & h_{12} \end{bmatrix} \begin{bmatrix} 1 \\ 1 \end{bmatrix} = \frac{1}{\sqrt{2}} \begin{bmatrix} h_{01} + h_{02} \\ h_{11} + h_{12} \end{bmatrix},$$

where UE Rx0 corresponds to reception of the SSB 516 by the first reception port 508, UE Rx1 corresponds to reception of the SSB 516 by the second reception port 510, and $$\begin{bmatrix} h_{01} & h_{02} \\ h_{11} & h_{12} \end{bmatrix}$$

is the channel matrix. In some aspects, the UE 502 may select a reception port using the port selection diversity metric: PsDiv Metric=max($|h_{01}+h_{02}|^2$, $|h_{11}+h_{12}|^2$). The UE 502 may perform beam sweeping and may evaluate the PsDiv Metric for each beam and port combination since SSBs are transmitted repeatedly (e.g., SSB is always on).

To ensure a port selection with a better performance, the at least one reference signal may include at least one DMRS. For example, in some aspects, the port selection diversity metric may include a maximum DMRS RSRP of a set of DMRS RSRPs corresponding to the first reception port 508 and the second reception port 510. The set of DMRS RSRPs may include at least one DMRS RSRP corresponding to the first reception port 508 and at least one DMRS RSRP corresponding to the second reception port 510. In some aspects, for example, the at least one DMRS RSRP corresponding to the first reception port 508 may include a first plurality of DMRS RSRPs associated with a plurality of reception beams and the at least one DMRS RSRP corresponding to the second reception port 510 may include a second plurality of DMRS RSRPs associated with the plurality of reception beams. In some aspects, the plurality of reception beams may include a plurality of reception beams that are not physical downlink shared channel (PDSCH) beams.

In some aspects, DMRS RSRP may be challenging to acquire on non-PDSCH beams. To facilitate acquiring DMRS RSRP on non-PDSCH beams, the UE 502 may receive the at least one reference signal (e.g., the at least one DMRS) during a beam management window based at least in part on determining that a window opening condition is satisfied. For example, in some aspects, the UE 502 may monitor downlink traffic parameters including a downlink duty cycle, and the UE 502 may determine that a window opening condition is satisfied based on the downlink duty cycle having a value that satisfies (e.g., equals or exceeds)

a threshold. For example, the downlink duty cycle may be indicated by the network node in a time division duplexing (TDD) parameter (e.g., a TDD-UL-DL-Pattern parameter) that indicates a number of uplink slots, a number of uplink symbols, a number of downlink slots, and a number of downlink symbols within a configurable period. In this case, the UE 502 may determine that the window opening condition is satisfied based on the downlink duty cycle having a value that satisfies the threshold or that the window opening condition is not satisfied based on the downlink duty cycle having a value that fails to satisfy the threshold. In this way, by opening the beam management window only in cases where the downlink duty cycle satisfies the threshold, the UE 502 may avoid corrupting a large proportion of PDSCH slots by using a non-PDSCH beam during the beam sweep on the PDSCH DMRS.

Using DMRS may result in a better selection due to the port selection metric and the PDSCH being activated similarly by the UE 502. For example, the UE 502 may activate the PDSCH using a rank-2 precoder, $$\begin{bmatrix} 1 & 1 \\ 1 & -1 \end{bmatrix};$$

$$\begin{bmatrix} UE\,Rx0 \\ UE\,Rx1 \end{bmatrix} = \frac{1}{2}\begin{bmatrix} 0 & 1 \end{bmatrix}\begin{bmatrix} h_{01} & h_{02} \\ h_{11} & h_{12} \end{bmatrix}\begin{bmatrix} 1 & 1 \\ 1 & -1 \end{bmatrix} = \frac{1}{2}\begin{bmatrix} h_{11}+h_{12} & h_{11}-h_{12} \end{bmatrix}.$$

Thus, where the at least one reference signal includes at least one SSB, the SSB Beam Selection Metric=$|h_{01}+h_{02}|^2+|h_{11}+h_{12}|^2$, the Rx0 DL Metric=$|h_{01}|^2+|h_{02}|^2$, and the Rx1 DL Metric=$|h_{11}|^2+|h_{12}|^2$. Thus, there may be a mismatch between the PsDiv Metric and the Rx0 DL metric.

However, the network node 504 may transmit a DMRS using the rank-2 precoder, resulting in a received signal:

$$\begin{bmatrix} UE\,Rx0 \\ UE\,Rx1 \end{bmatrix} = \frac{1}{2}\begin{bmatrix} h_{01} & h_{02} \\ h_{11} & h_{12} \end{bmatrix}\begin{bmatrix} 1 & 1 \\ 1 & -1 \end{bmatrix} = \frac{1}{2}\begin{bmatrix} h_{01}+h_{02} & h_{01}-h_{02} \\ h_{11}+h_{12} & h_{11}-h_{12} \end{bmatrix}.$$

In this case, the DMRS Beam Selection Metric=$|h_{01}|^2+|h_{02}|^2+|h_{11}|^2+|h_{12}|^2$, the Rx0 DL Metric=$|h_{01}|^2+|h_{02}|^2$, and the Tx1 UL/Rx1 DL Metric=$|h_{11}|^2+|h_{12}|^2$. The UE 502 may use a port selection diversity metric, PsDiv Metric=max($|h_{01}|^2+|h_{02}|^2$, $|h_{11}|^2+|h_{12}|^2$). As a result, there may be no mismatch between the channel representations associated with the DMRS and the PDSCH.

As indicated above, FIG. 5 is provided as an example of beam management procedures. Other examples of beam management procedures may differ from what is described with respect to FIG. 5.

Figure 6:
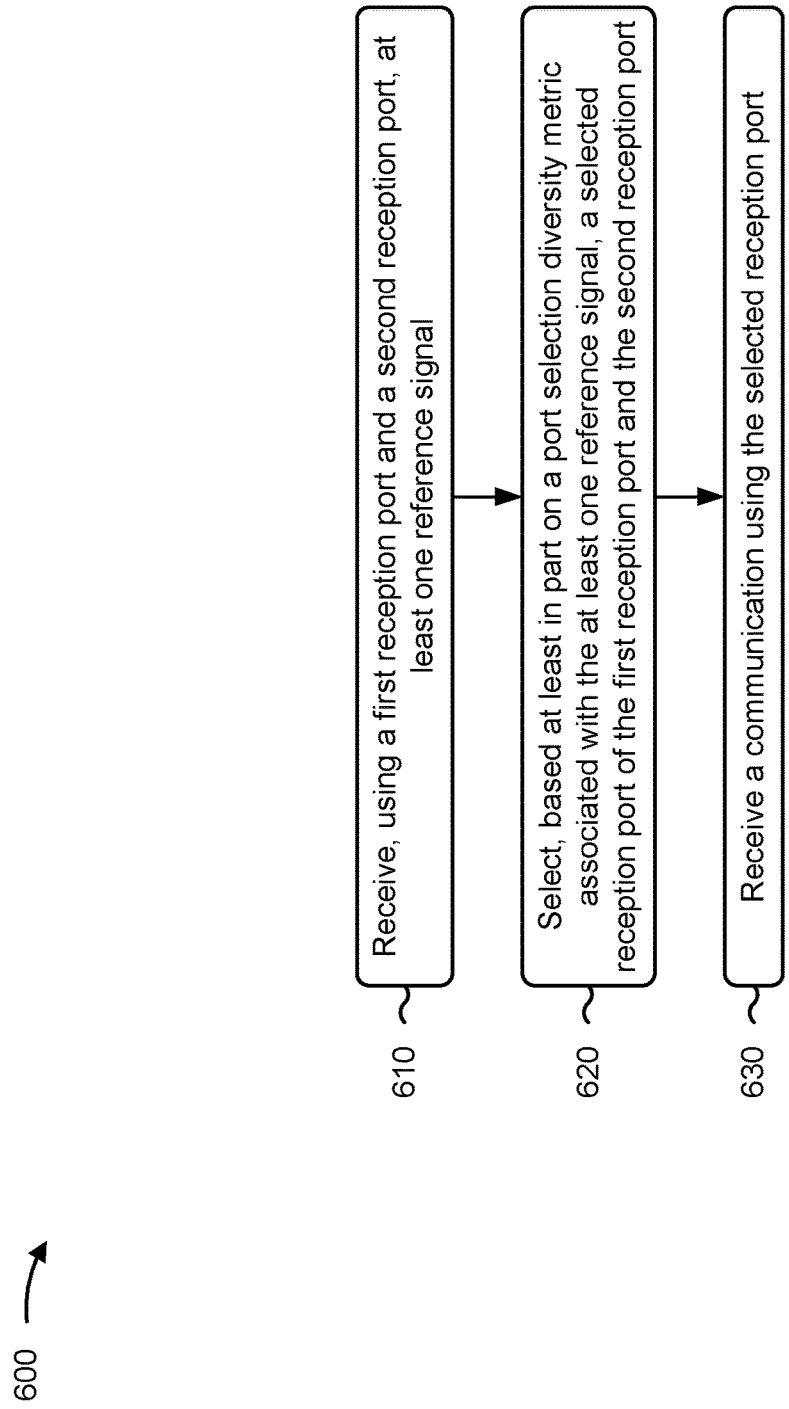
FIG. 6 is a diagram illustrating an example process associated with port selection diversity, in accordance with the present disclosure.

FIG. 6 is a diagram illustrating an example process 600 performed, for example, by a UE, in accordance with the present disclosure. Example process 600 is an example where the UE (e.g., UE 120) performs operations associated with port selection diversity.

As shown in FIG. 6, in some aspects, process 600 may include receiving, using a first reception port and a second reception port, at least one reference signal (block 610). For example, the UE (e.g., using communication manager 708 and/or reception component 702, depicted in FIG. 7) may receive, using a first reception port and a second reception port, at least one reference signal, as described above.

As further shown in FIG. 6, in some aspects, process 600 may include selecting, based at least in part on a port selection diversity metric associated with the at least one reference signal, a selected reception port of the first reception port and the second reception port (block 620). For example, the UE (e.g., using communication manager 708 and/or selection component 710, depicted in FIG. 7) may select, based at least in part on a port selection diversity metric associated with the at least one reference signal, a selected reception port of the first reception port and the second reception port, as described above.

As further shown in FIG. 6, in some aspects, process 600 may include receiving a communication using the selected reception port (block 630). For example, the UE (e.g., using communication manager 708 and/or reception component 702, depicted in FIG. 7) may receive a communication using the selected reception port, as described above.

Process 600 may include additional aspects, such as any single aspect or any combination of aspects described below and/or in connection with one or more other processes described elsewhere herein.

In a first aspect, the at least one reference signal comprises at least one SSB. In a second aspect, alone or in combination with the first aspect, the port selection diversity metric comprises a maximum SSB RSRP of a set of SSB RSRPs corresponding to the first reception port and the second reception port. In a third aspect, alone or in combination with the second aspect, the set of SSB RSRPs comprises at least one SSB RSRP corresponding to the first reception port and at least one SSB RSRP corresponding to the second reception port. In a fourth aspect, alone or in combination with the third aspect, the at least one SSB RSRP corresponding to the first reception port comprises a first plurality of SSB RSRPs associated with a plurality of reception beams. In a fifth aspect, alone or in combination with the fourth aspect, the at least one SSB RSRP corresponding to the second reception port comprises a second plurality of SSB RSRPs associated with the plurality of reception beams. In a sixth aspect, alone or in combination with one or more of the second through fifth aspects, each SSB RSRP of the set of SSB RSRPs comprises a rank-1 metric.

In a seventh aspect, alone or in combination with one or more of the second through sixth aspects, the at least one reference signal comprises at least one DMRS. In an eighth aspect, alone or in combination with the seventh aspect, the port selection diversity metric comprises a maximum DMRS RSRP of a set of DMRS RSRPs corresponding to the first reception port and the second reception port. In a ninth aspect, alone or in combination with the eighth aspect, the set of DMRS RSRPs comprises at least one DMRS RSRP corresponding to the first reception port and at least one DMRS RSRP corresponding to the second reception port. In a tenth aspect, alone or in combination with the ninth aspect, the at least one DMRS RSRP corresponding to the first reception port comprises a first plurality of DMRS RSRPs associated with a plurality of reception beams. In an eleventh aspect, alone or in combination with the tenth aspect, the at least one DMRS RSRP corresponding to the second reception port comprises a second plurality of DMRS RSRPs associated with the plurality of reception beams. In a twelfth aspect, alone or in combination with the tenth aspect, the plurality of reception beams comprises a plurality of reception beams that are not PDSCH beams.

In a thirteenth aspect, alone or in combination with one or more of the first or seventh through twelfth aspects, each DMRS RSRP of the set of DMRS RSRPs comprises a rank-2 metric. In a fourteenth aspect, alone or in combination with one or more of the first or seventh through thirteenth aspects, process 600 includes determining that a window opening condition is satisfied, wherein receiving the at least one reference signal comprises receiving the at least one reference signal based at least in part on determining that the window opening condition is satisfied.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
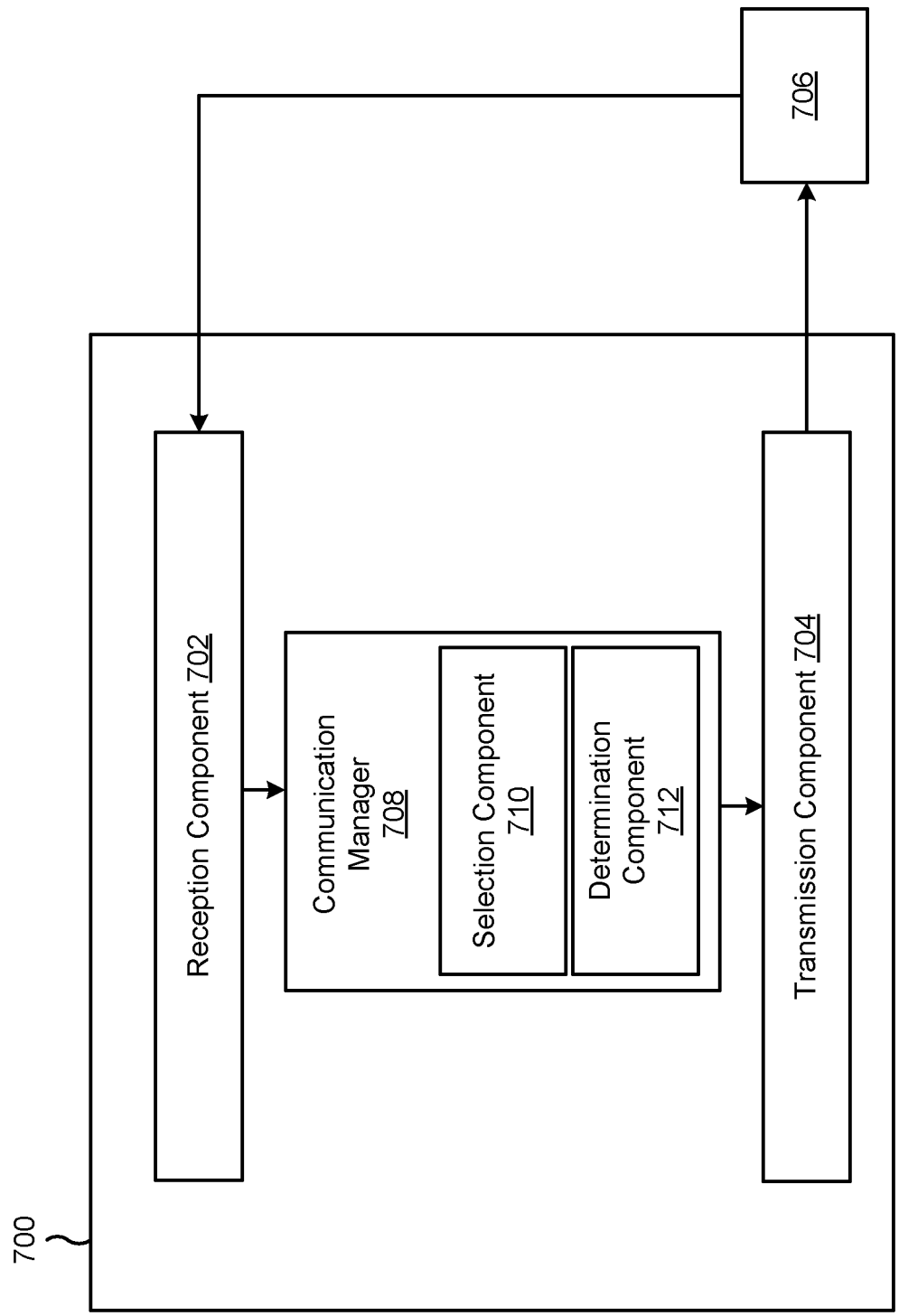
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708. The communication manager 708 may include one or more of a selection component 710, or a determination component 712, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

In some aspects, the communication manager 708 may include one or more antennas, a modem, a controller/processor, a memory, or a combination thereof, of the UE described in connection with FIG. 2. In some aspects, the communication manager 708 may include the reception component 702 and/or the transmission component 704. In some aspects, the communication manager 708 may be, be similar to, include, or be included in, the communication manager 140 depicted in FIGS. 1 and 2. In some aspects, the selection component 710 may include one or more antennas, a modem, a controller/processor, a memory, or a combination thereof, of the UE described in connection with FIG. 2. In some aspects, the selection component 710 may include the reception component 702 and/or the transmission component 704. In some aspects, the determination component 712 may include one or more antennas, a modem, a controller/processor, a memory, or a combination thereof, of the UE described in connection with FIG. 2. In some aspects, the determination component 712 may include the reception component 702 and/or the transmission component 704.

The reception component 702 may receive, using a first reception port and a second reception port, at least one reference signal. The communication manager 708 and/or the selection component 710 may select, based at least in part on a port selection diversity metric associated with the at least one reference signal, a selected reception port of the first reception port and the second reception port. The reception component 702 may receive a communication using the selected reception port. The determination component 712 may determine that a window opening condition is satisfied, wherein receiving the at least one reference signal comprises receiving the at least one reference signal based at least in part on determining that the window opening condition is satisfied.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, using a first reception port and a second reception port, at least one reference signal; selecting, based at least in part on a port selection diversity metric associated with the at least one reference signal, a selected reception port of the first reception port and the second reception port; and receiving a communication using the selected reception port.

Aspect 2: The method of Aspect 1, wherein the at least one reference signal comprises at least one synchronization signal block (SSB).

Aspect 3: The method of Aspect 2, wherein the port selection diversity metric comprises a maximum SSB reference signal received power (RSRP) of a set of SSB RSRPs corresponding to the first reception port and the second reception port.

Aspect 4: The method of Aspect 3, wherein the set of SSB RSRPs comprises at least one SSB RSRP corresponding to the first reception port and at least one SSB RSRP corresponding to the second reception port.

Aspect 5: The method of Aspect 4, wherein the at least one SSB RSRP corresponding to the first reception port comprises a first plurality of SSB RSRPs associated with a plurality of reception beams.

Aspect 6: The method of Aspect 5, wherein the at least one SSB RSRP corresponding to the second reception port comprises a second plurality of SSB RSRPs associated with the plurality of reception beams.

Aspect 7: The method of any of Aspects 3-6, wherein each SSB RSRP of the set of SSB RSRPs comprises a rank-1 metric.

Aspect 8: The method of any of Aspects 3-6, wherein the at least one reference signal comprises at least one demodulation reference signal (DMRS).

Aspect 9: The method of Aspect 8, wherein the port selection diversity metric comprises a maximum DMRS reference signal received power (RSRP) of a set of DMRS RSRPs corresponding to the first reception port and the second reception port.

Aspect 10: The method of Aspect 9, wherein the set of DMRS RSRPs comprises at least one DMRS RSRP corresponding to the first reception port and at least one DMRS RSRP corresponding to the second reception port.

Aspect 11: The method of Aspect 10, wherein the at least one DMRS RSRP corresponding to the first reception port comprises a first plurality of DMRS RSRPs associated with a plurality of reception beams.

Aspect 12: The method of Aspect 11, wherein the at least one DMRS RSRP corresponding to the second reception port comprises a second plurality of DMRS RSRPs associated with the plurality of reception beams.

Aspect 13: The method of Aspect 11, wherein the plurality of reception beams comprises a plurality of reception beams that are not physical downlink shared channel (PDSCH) beams.

Aspect 14: The method of any of Aspects 1 or 8-13, wherein each DMRS RSRP of the set of DMRS RSRPs comprises a rank-2 metric.

Aspect 15: The method of any of Aspects 1 or 8-14, further comprising determining that a window opening condition is satisfied, wherein receiving the at least one reference signal comprises receiving the at least one reference signal based at least in part on determining that the window opening condition is satisfied.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, using a first reception port and a second reception port, at least one reference signal;
select, based at least in part on a port selection diversity metric associated with the at least one reference signal, a selected reception port of the first reception port and the second reception port; and
receive a communication using the selected reception port.

2. The UE of claim 1, wherein the at least one reference signal comprises at least one synchronization signal block (SSB).

3. The UE of claim 2, wherein the port selection diversity metric comprises a maximum SSB reference signal received power (RSRP) of a set of SSB RSRPs corresponding to the first reception port and the second reception port.

4. The UE of claim 3, wherein the set of SSB RSRPs comprises at least one SSB RSRP corresponding to the first reception port and at least one SSB RSRP corresponding to the second reception port.

5. The UE of claim 4, wherein the at least one SSB RSRP corresponding to the first reception port comprises a first plurality of SSB RSRPs associated with a plurality of reception beams.

6. The UE of claim 5, wherein the at least one SSB RSRP corresponding to the second reception port comprises a second plurality of SSB RSRPs associated with the plurality of reception beams.

7. The UE of claim 3, wherein each SSB RSRP of the set of SSB RSRPs comprises a rank-1 metric.

8. The UE of claim 1, wherein the at least one reference signal comprises at least one demodulation reference signal (DMRS).

9. The UE of claim 8, wherein the port selection diversity metric comprises a maximum DMRS reference signal received power (RSRP) of a set of DMRS RSRPs corresponding to the first reception port and the second reception port.

10. The UE of claim 9, wherein the set of DMRS RSRPs comprises at least one DMRS RSRP corresponding to the first reception port and at least one DMRS RSRP corresponding to the second reception port.

11. The UE of claim 10, wherein the at least one DMRS RSRP corresponding to the first reception port comprises a first plurality of DMRS RSRPs associated with a plurality of reception beams.

12. The UE of claim 11, wherein the at least one DMRS RSRP corresponding to the second reception port comprises a second plurality of DMRS RSRPs associated with the plurality of reception beams.

13. The UE of claim 11, wherein the plurality of reception beams comprises a plurality of reception beams that are not physical downlink shared channel (PDSCH) beams.

14. The UE of claim 9, wherein each DMRS RSRP of the set of DMRS RSRPs comprises a rank-2 metric.

15. The UE of claim 1, wherein the one or more processors are further configured to determine that a window opening condition is satisfied, wherein the one or more processors, to receive the at least one reference signal, are configured to receive the at least one reference signal based at least in part on determining that the window opening condition is satisfied.

16. A method of wireless communication performed by a user equipment (UE), comprising:
receiving, using a first reception port and a second reception port, at least one reference signal;
selecting, based at least in part on a port selection diversity metric associated with the at least one reference signal, a selected reception port of the first reception port and the second reception port; and
receiving a communication using the selected reception port.

17. The method of claim 16, wherein the at least one reference signal comprises at least one synchronization signal block (SSB).

18. The method of claim 17, wherein the port selection diversity metric comprises a maximum SSB reference signal received power (RSRP) of a set of SSB RSRPs corresponding to the first reception port and the second reception port.

19. The method of claim 18, wherein the set of SSB RSRPs comprises at least one SSB RSRP corresponding to the first reception port and at least one SSB RSRP corresponding to the second reception port.

20. The method of claim 19, wherein the at least one SSB RSRP corresponding to the first reception port comprises a first plurality of SSB RSRPs associated with a plurality of reception beams.

21. The method of claim 20, wherein the at least one SSB RSRP corresponding to the second reception port comprises a second plurality of SSB RSRPs associated with the plurality of reception beams.

22. The method of claim 18, wherein each SSB RSRP of the set of SSB RSRPs comprises a rank-1 metric.

23. The method of claim 16, wherein the at least one reference signal comprises at least one demodulation reference signal (DMRS).

24. The method of claim 23, wherein the port selection diversity metric comprises a maximum DMRS reference signal received power (RSRP) of a set of DMRS RSRPs corresponding to the first reception port and the second reception port.

25. The method of claim 24, wherein each DMRS RSRP of the set of DMRS RSRPs comprises a rank-2 metric.

26. The method of claim 16, further comprising determining that a window opening condition is satisfied, wherein receiving the at least one reference signal comprises receiving the at least one reference signal based at least in part on determining that the window opening condition is satisfied.

27. A non-transitory computer-readable medium storing a set of instructions for wireless communication, the set of instructions comprising:
  one or more instructions that, when executed by one or more processors of a user equipment (UE), cause the UE to:
    receive, using a first reception port and a second reception port, at least one reference signal;
    select, based at least in part on a port selection diversity metric associated with the at least one reference signal, a selected reception port of the first reception port and the second reception port; and
    receive a communication using the selected reception port.

28. The non-transitory computer-readable medium of claim 27, wherein the at least one reference signal comprises at least one of a synchronization signal block or a demodulation reference signal.

29. An apparatus for wireless communication, comprising:
  means for receiving, using a first reception port and a second reception port, at least one reference signal;
  means for selecting, based at least in part on a port selection diversity metric associated with the at least one reference signal, a selected reception port of the first reception port and the second reception port; and
  means for receiving a communication using the selected reception port.

30. The apparatus of claim 29, wherein the at least one reference signal comprises at least one of a synchronization signal block or a demodulation reference signal.

\* \* \* \* \*